US012415378B2

(12) United States Patent
Griffith

(10) Patent No.: US 12,415,378 B2
(45) Date of Patent: Sep. 16, 2025

(54) PAINTBRUSH AND PAINT ROLLER SUPPORT RACK AND METHODS OF USING SAME

(71) Applicant: JG Enterprises Ltd., LLC, Charlotte, NC (US)

(72) Inventor: James Anthony Griffith, Charlotte, NC (US)

(73) Assignee: JG Enterprises Ltd., LLC, Charlotte, NC (US)

( * ) Notice: Subject to any disclaimer, the term of this patent is extended or adjusted under 35 U.S.C. 154(b) by 30 days.

(21) Appl. No.: 18/197,351

(22) Filed: May 15, 2023

(65) Prior Publication Data

US 2023/0382154 A1 Nov. 30, 2023

Related U.S. Application Data

(60) Provisional application No. 63/345,537, filed on May 25, 2022.

(51) Int. Cl.

*B44D 3/12* (2006.01)
*A46B 17/00* (2006.01)

(52) U.S. Cl.

CPC .............. *B44D 3/123* (2013.01); *A46B 17/00* (2013.01); *B44D 3/125* (2013.01); *A46B 2200/202* (2013.01)

(58) Field of Classification Search

CPC ......... A46B 17/00; A46B 17/02; A46B 17/06; A46B 2200/202; B44D 3/12; B44D 3/121; B44D 3/123; B44D 3/125

See application file for complete search history.

(56) References Cited

U.S. PATENT DOCUMENTS

| | | | | | |
|---|---|---|---|---|---|
| 2,566,650 | A * | 9/1951 | Anderson | B44D 3/125 | 211/65 |
| 2,744,635 | A * | 5/1956 | Hiss | B44D 3/125 | 248/113 |
| 4,865,282 | A * | 9/1989 | Yonkman | B44D 3/123 | 220/736 |
| 5,645,091 | A * | 7/1997 | Hoeft | B44D 3/006 | 206/209 |
| 5,833,080 | A * | 11/1998 | Donne | A47F 7/0064 | 248/175 |
| D431,701 | S * | 10/2000 | Castillo | D32/54 | |
| 6,193,080 | B1 * | 2/2001 | Castillo | B44D 3/123 | 211/66 |

(Continued)

*Primary Examiner* — Patrick D Hawn

(74) *Attorney, Agent, or Firm* — Ward and Smith, P.A.; Ryan K. Simmons

(57) ABSTRACT

A paintbrush and paint roller support rack and methods of using same. The paintbrush and paint roller support rack may include an upper support rack, a lower support rack, and vertical members extending between the lower support rack and the upper support rack, the vertical members supporting the upper support rack a distance above the lower support rack. The upper support rack may include inward extending upper horizontal support members spaced thereabout and the lower support rack may include inward extending lower horizontal members spaced thereabout, and the inward extending lower horizontal members may include one or more support pegs extending vertically upwards from the one or more of the lower horizontal members.

14 Claims, 17 Drawing Sheets

(56) References Cited

U.S. PATENT DOCUMENTS

| | | | | |
|---|---|---|---|---|
| 7,819,366 | B2 * | 10/2010 | Paga, Jr. | B44D 3/123<br>248/302 |
| 8,701,899 | B2 * | 4/2014 | Paga | B44D 3/123<br>248/302 |
| 9,067,462 | B1 * | 6/2015 | Pressler | B44D 3/127 |
| 9,102,193 | B1 * | 8/2015 | Mahowald | B44D 3/127 |
| 10,457,091 | B1 * | 10/2019 | Byker | B44D 3/006 |
| 11,225,104 | B2 * | 1/2022 | Hepinstall | B44D 3/123 |
| 11,331,943 | B2 * | 5/2022 | Livingston | B44D 3/121 |
| 11,383,549 | B2 * | 7/2022 | Turner | B44D 3/123 |
| 11,766,113 | B2 * | 9/2023 | Molett, III | B44D 3/006<br>134/201 |
| 2015/0360505 | A1 * | 12/2015 | Beck | B44D 3/123<br>211/65 |

* cited by examiner (SIDE)

(TOP DOWN)

(SIDE)

PAINTBRUSH AND PAINT ROLLER SUPPORT RACK AND METHODS OF USING SAME

RELATED APPLICATIONS

This application claims priority to U.S. Provisional Patent App. No. 63/345,537, filed May 25, 2022, the entire disclosure of which is incorporated herein by reference.

TECHNICAL FIELD

The subject matter of the invention relates generally to painting equipment and more particularly to a paintbrush and paint roller support rack and methods of using same.

BACKGROUND

In residential and/or commercial painting, painters store and carry their paintbrushes and paint rollers in a tote bag. Even though the paintbrushes are cleaned and stowed in the tote bag after each use, over time the bristles may become damaged or be in disarray due to the brushes laying loosely atop other brushes and/or atop other equipment and due to the deterioration of the paintbrush shucks.

SUMMARY

In one embodiment, a paintbrush and paint roller support rack is provided. The paintbrush and paint roller support rack may include an upper support rack, a lower support rack, and vertical members extending between the lower support rack and the upper support rack, the vertical members supporting the upper support rack a distance above the lower support rack. The upper support rack may include inward extending upper horizontal members spaced thereabout and the lower support rack may include inward extending lower horizontal members spaced thereabout, and the inward extending lower horizontal members may include one or more support pegs extending vertically upwards from the one or more of the lower horizontal members. The upper support rack and the lower support rack may each be of a generally ring shaped structure. The lower horizontal members may be configured as one or more cross members. One or more of the upper horizontal members may include one or more notches formed along a top surface thereof. One or more of the upper horizontal members may include an angled tip portion. The distance between the upper support rack and the lower support rack may be substantially equal to or less than a height of a standard 5-gallon paint style bucket. The upper support rack may have a diameter larger than that of the lower support rack. The upper support rack and the lower support rack may each have a diameter smaller than that of a standard 5-gallon paint style bucket. The upper support rack and the lower support rack may be substantially centered along a common vertical axis. The upper horizontal members may have a cross-sectional diameter such that they fit through a hole in a handle of a standard paintbrush. The upper horizontal members may have a cross-sectional diameter in the range of about 0.25 inches. The upper horizontal members may have a length equal to or less than the radius of the upper support rack. The one or more support pegs may have a cross-sectional diameter such that they fit within a hollow center portion of a standard paint roller. The paintbrush and paint roller support rack may further include a carrying handle attached to the upper support rack.

In yet another embodiment, a method of using a paintbrush and paint roller support rack is provided. The method may include providing a paintbrush and paint roller support rack. The paintbrush and paint roller support rack may include an upper support rack, a lower support rack, and vertical members extending between the lower support rack and the upper support rack, the vertical members supporting the upper support rack a distance above the lower support rack. The upper support rack may include inward extending upper horizontal members spaced thereabout and the lower support rack may include inward extending lower horizontal members spaced thereabout, and the inward extending lower horizontal members may include one or more support pegs extending vertically upwards from the one or more of the lower horizontal members. The method may further include, loading one or more paintbrushes and/or paint rollers onto one or more of the upper horizontal members and/or one or more of the support pegs respectively. The method may further include providing a standard 5-gallon paint style bucket and inserting the paintbrush and paint roller support rack into the standard 5-gallon paint style bucket either prior to or after loading the paintbrush and paint roller support rack with one or more of paintbrushes and/or paint rollers. The method may further include installing a lid on the standard 5-gallon paint style bucket with the paintbrush and paint roller support rack installed therein.

BRIEF DESCRIPTION OF THE DRAWINGS

Figure 1:
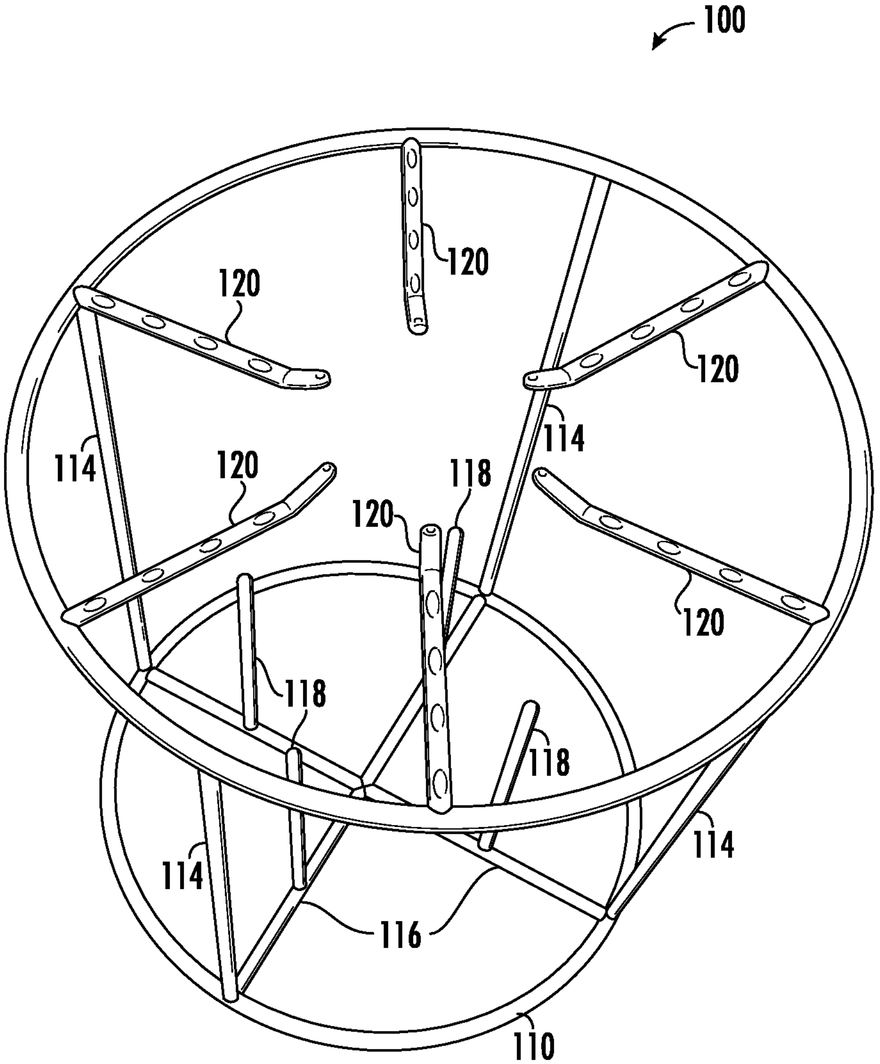
Figure 2:
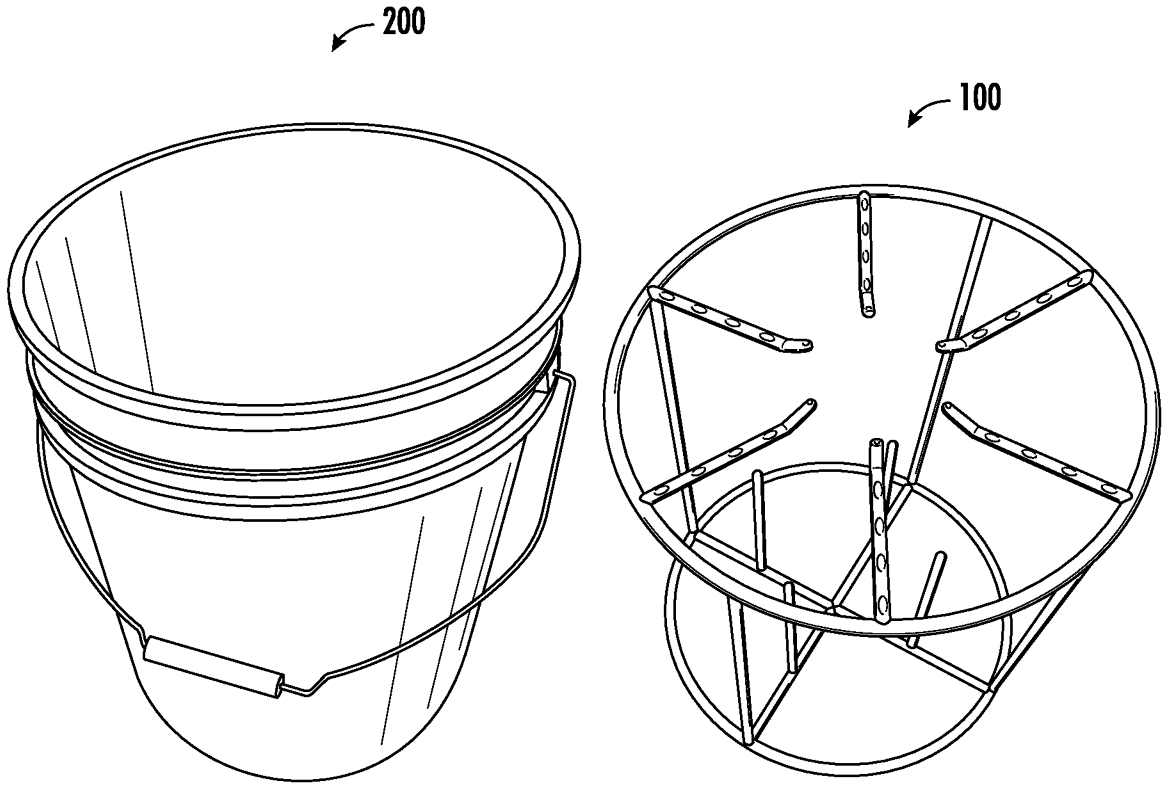
Figure 3:
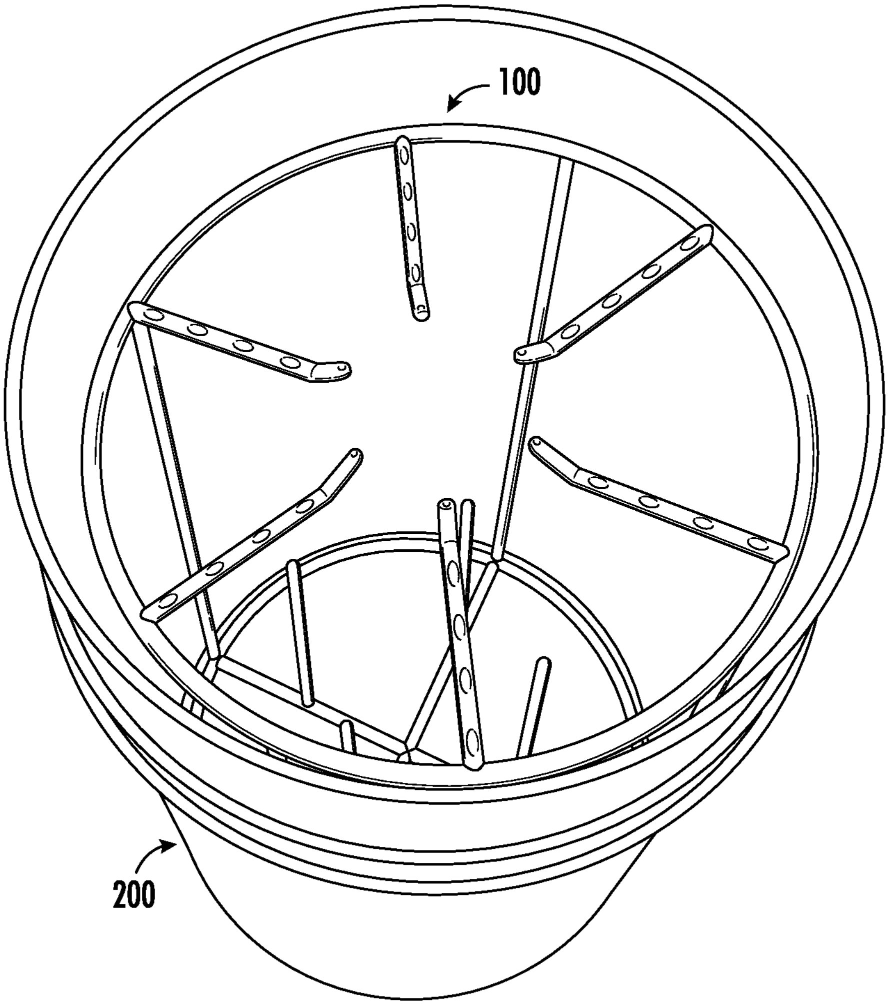
Figure 4:
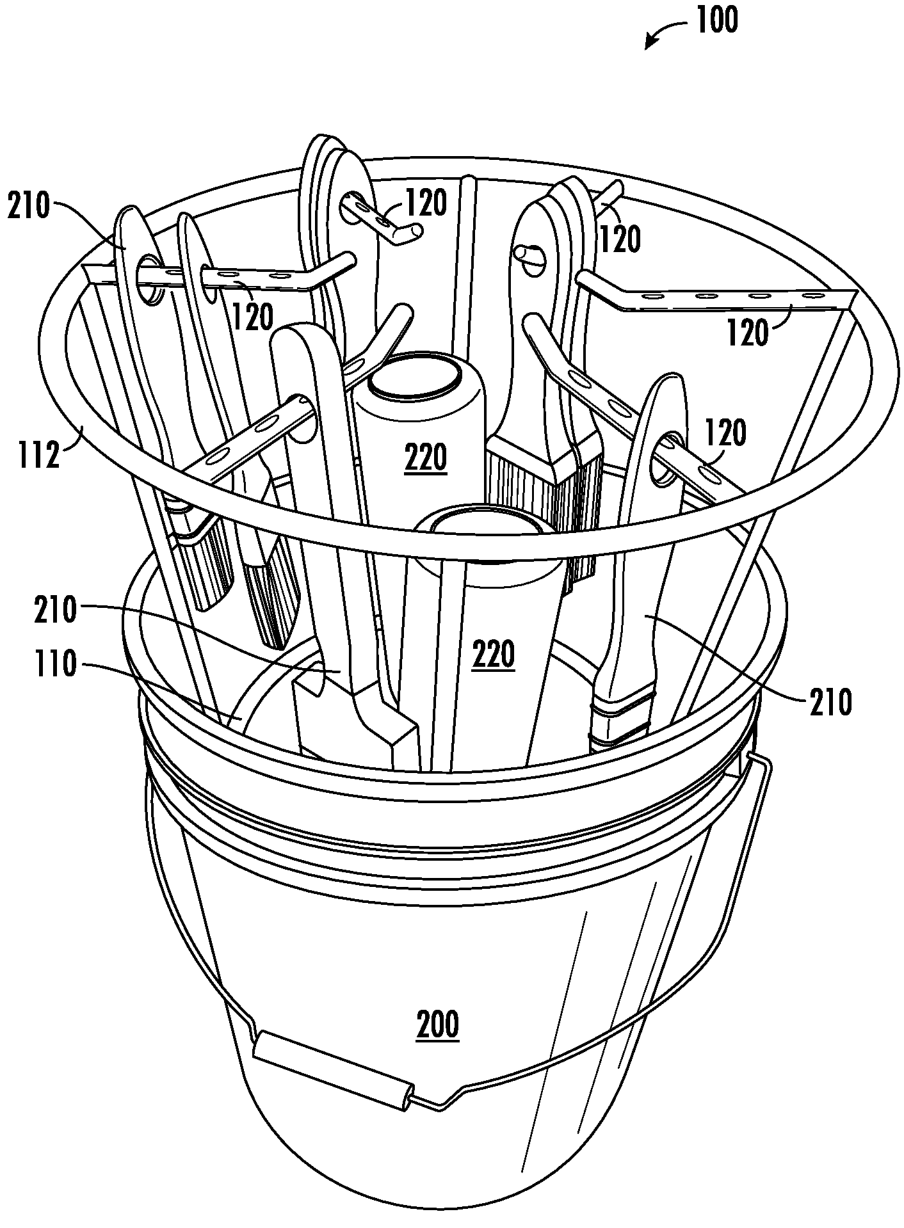
Figure 5:
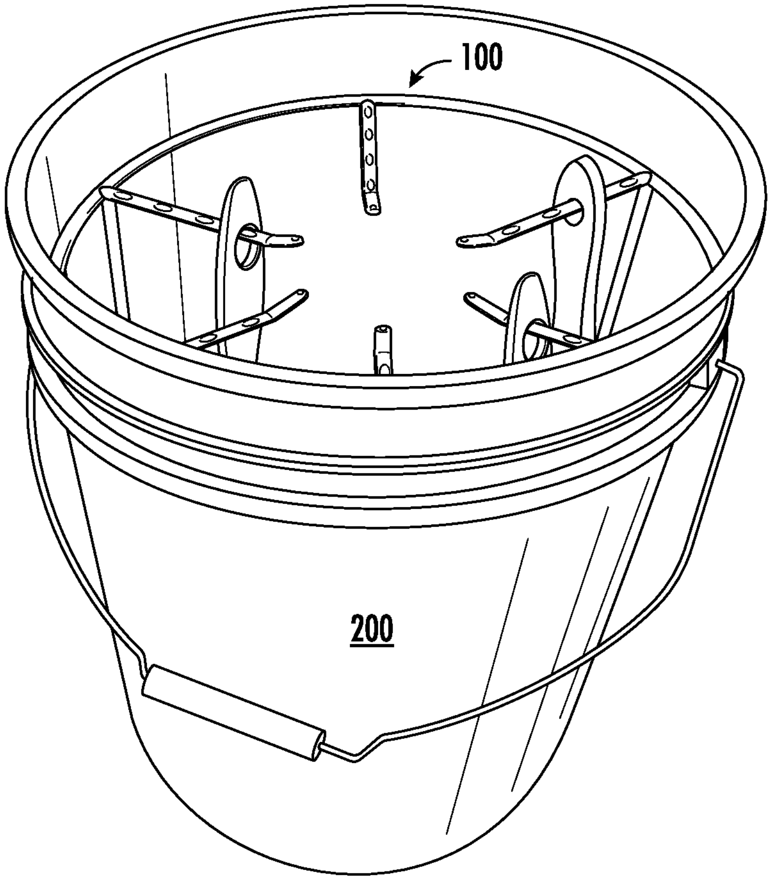
Figure 6:
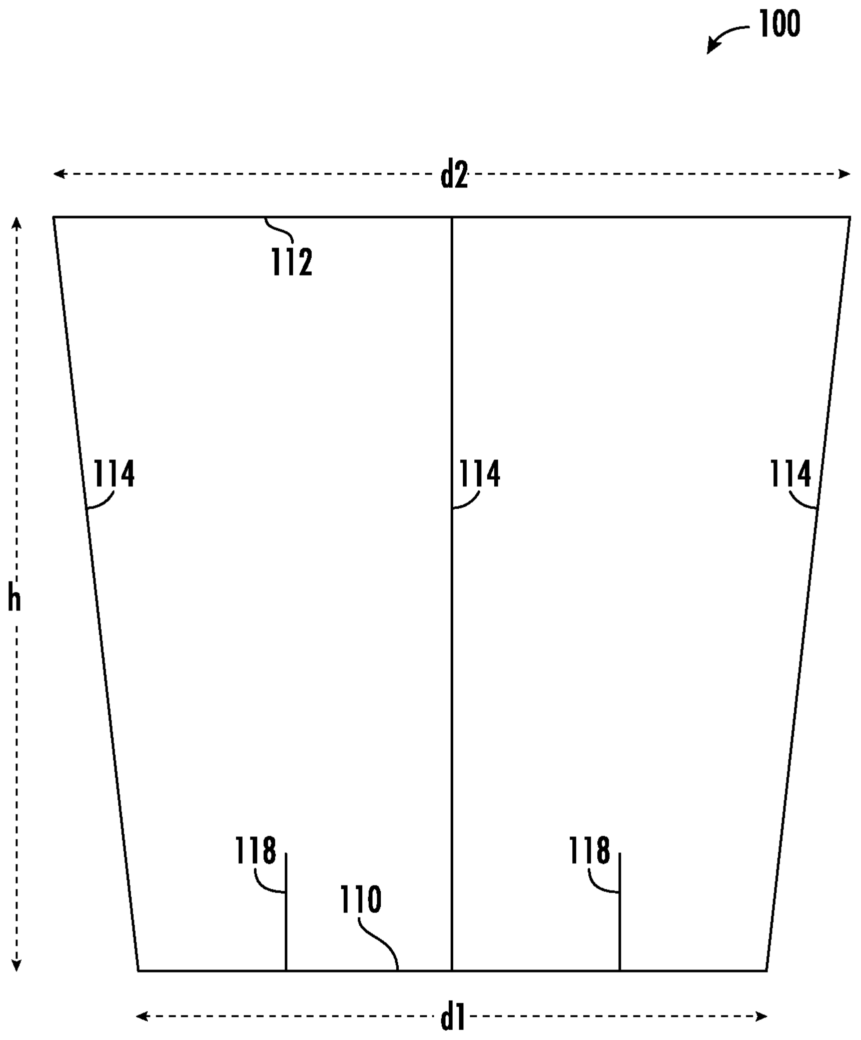
Figure 7:
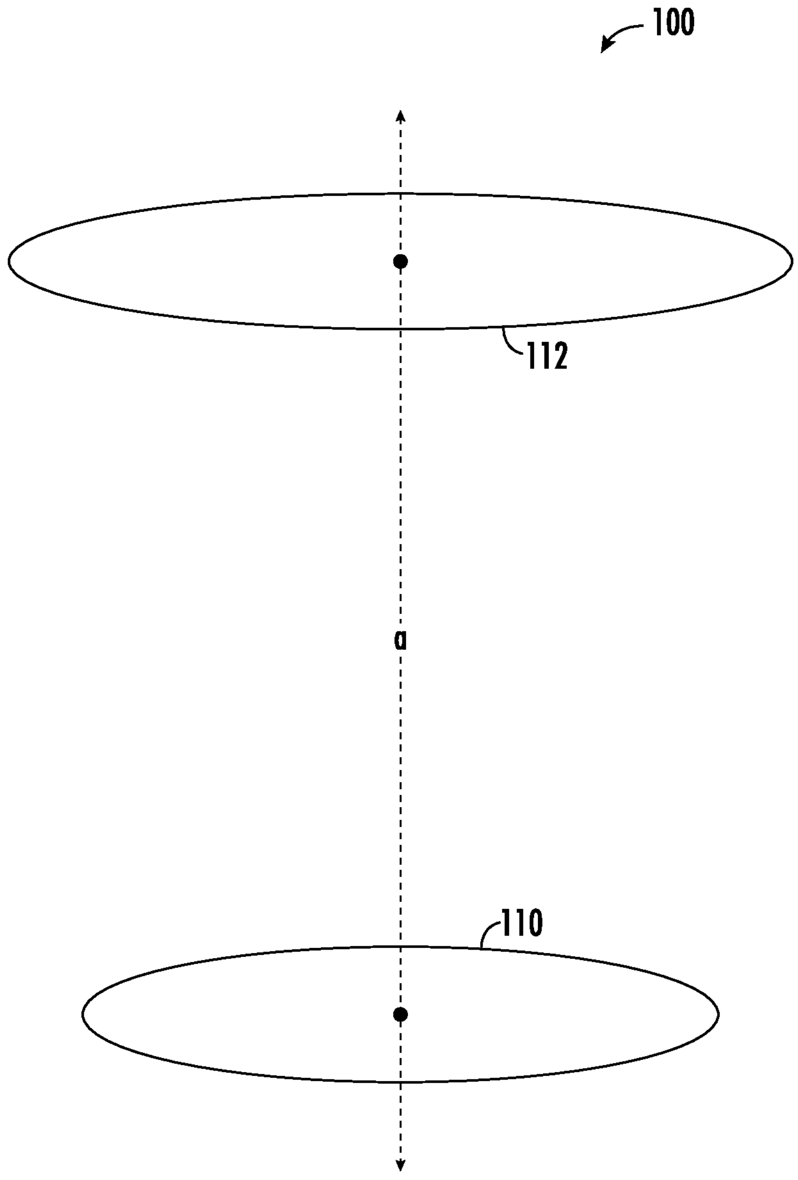
Figure 8:
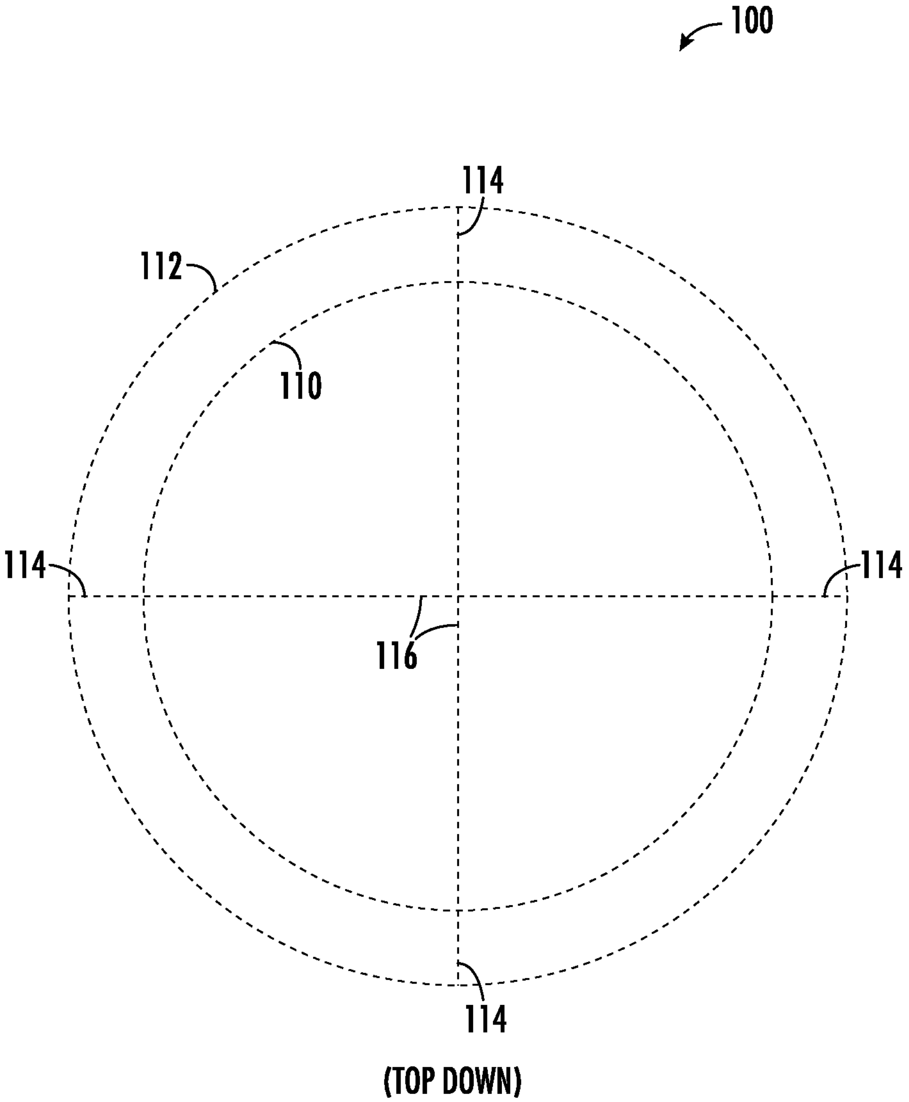
Figure 9:
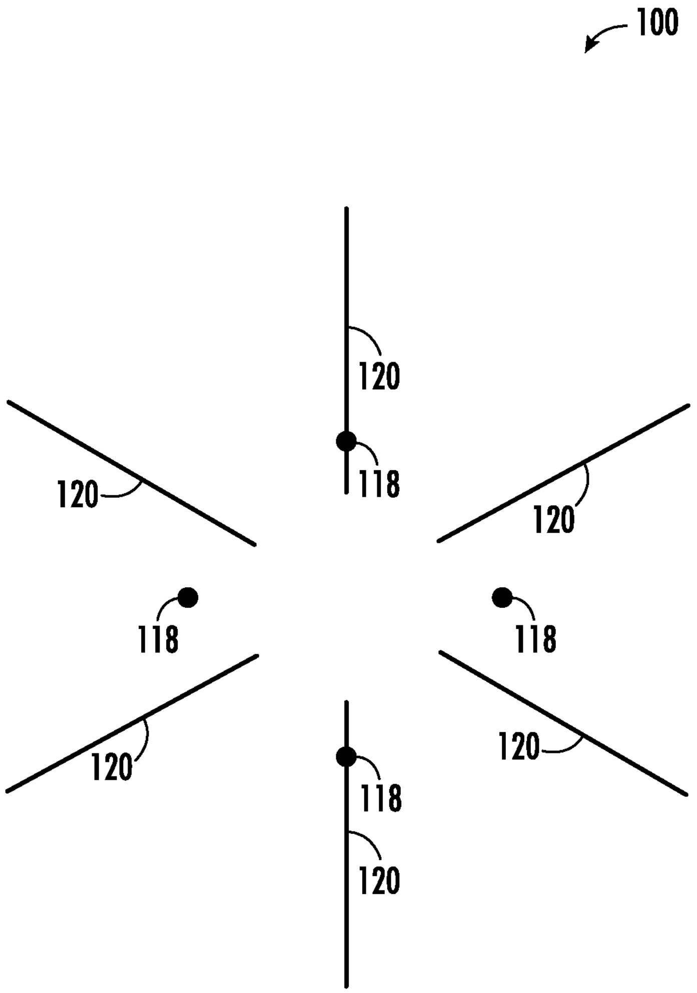
Figure 10:
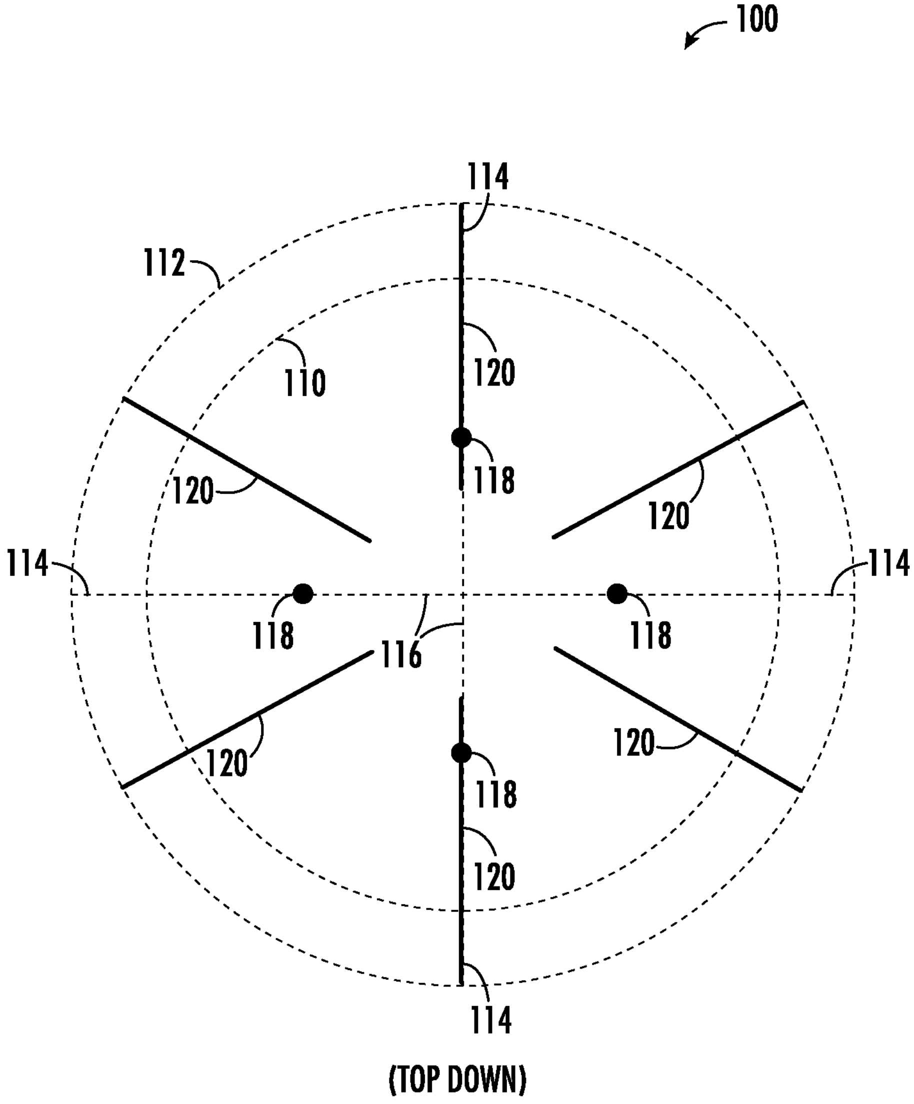
Figure 11:
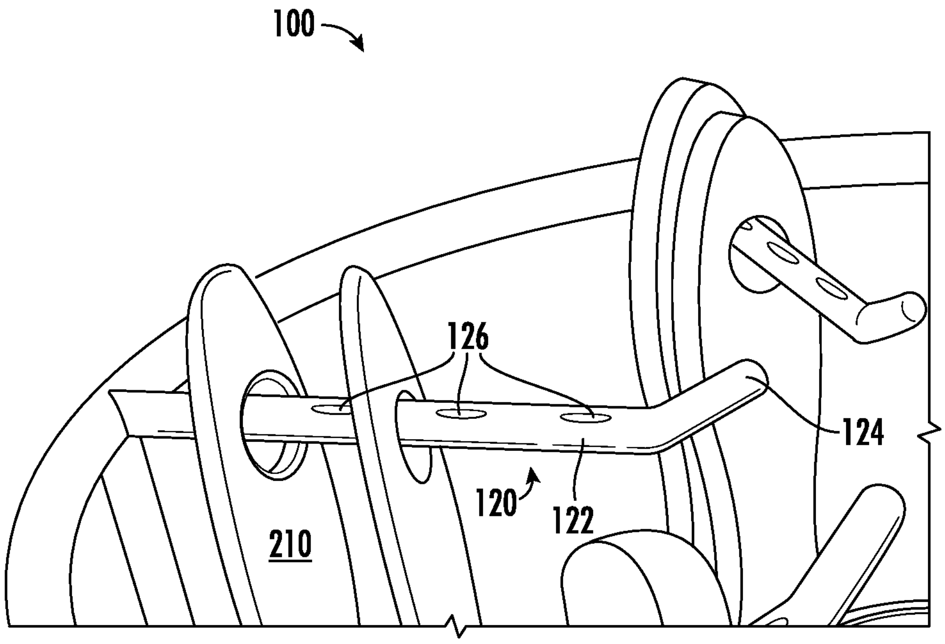
Figure 12:
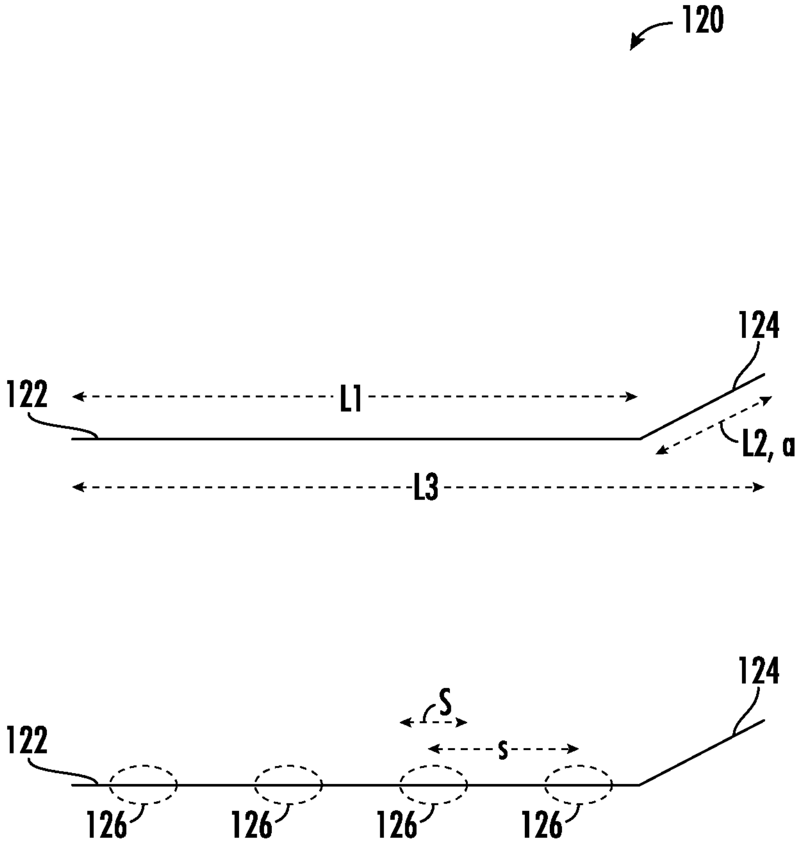
Figure 13:
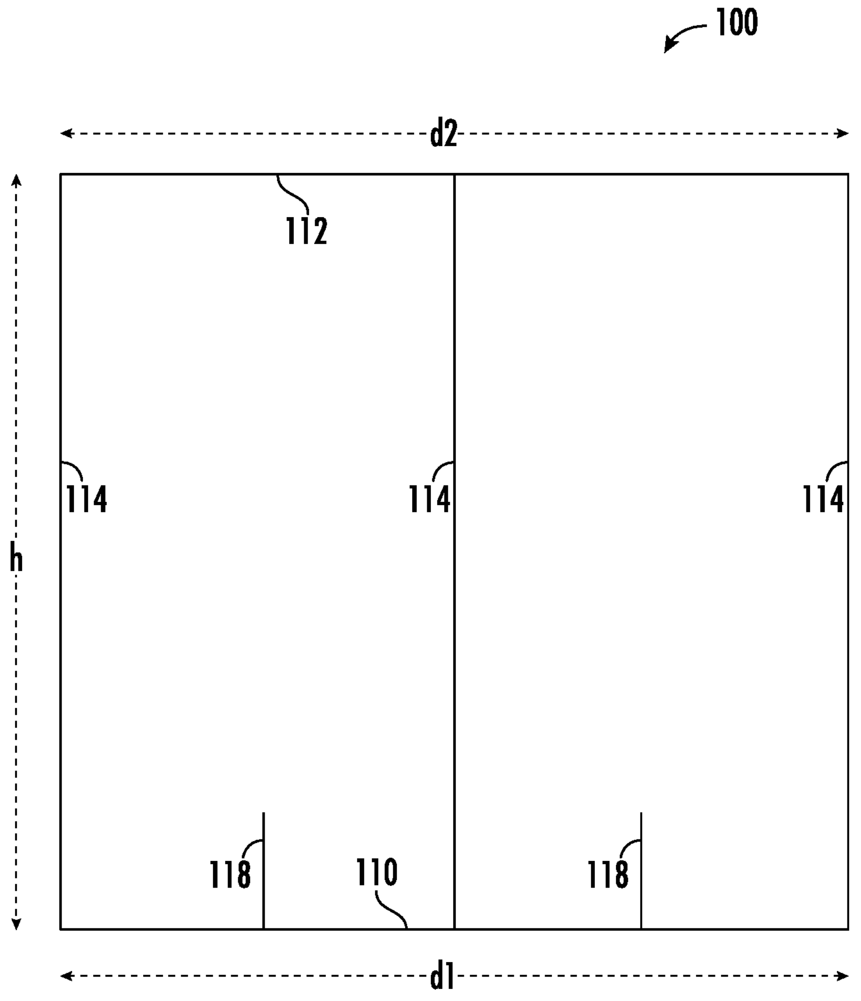
Figure 14:
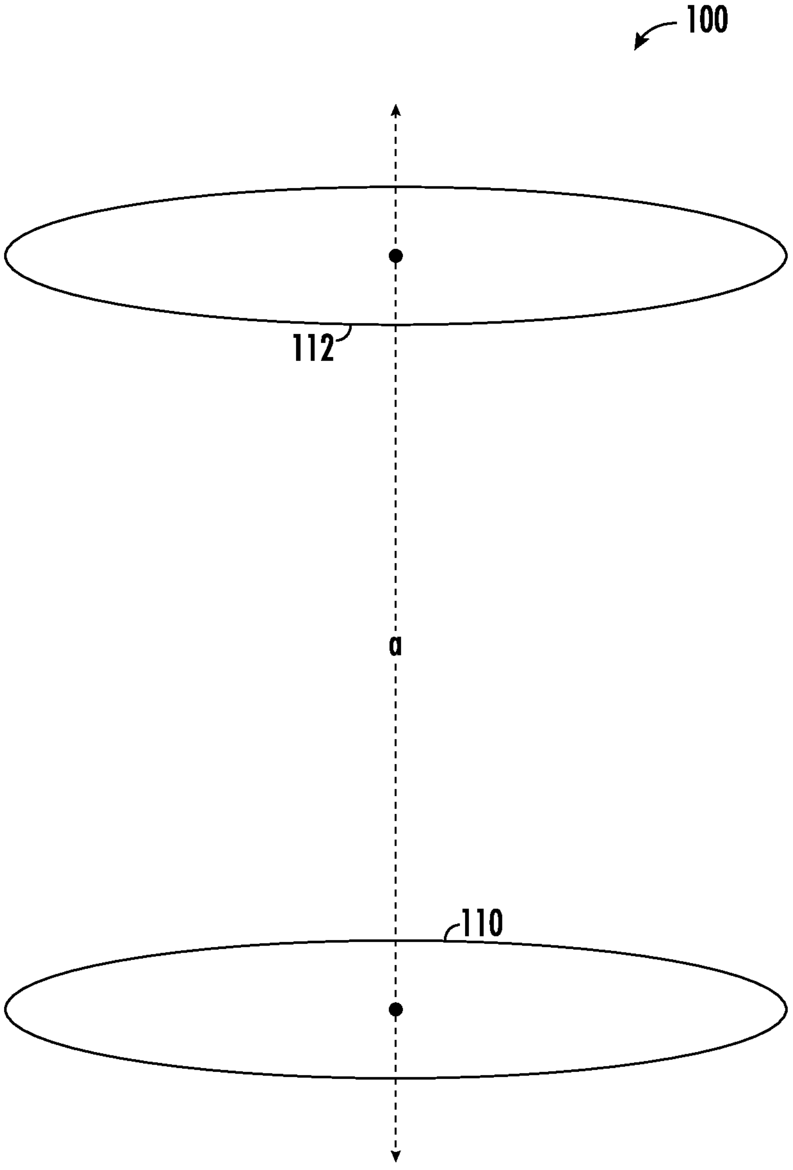
Figure 15:
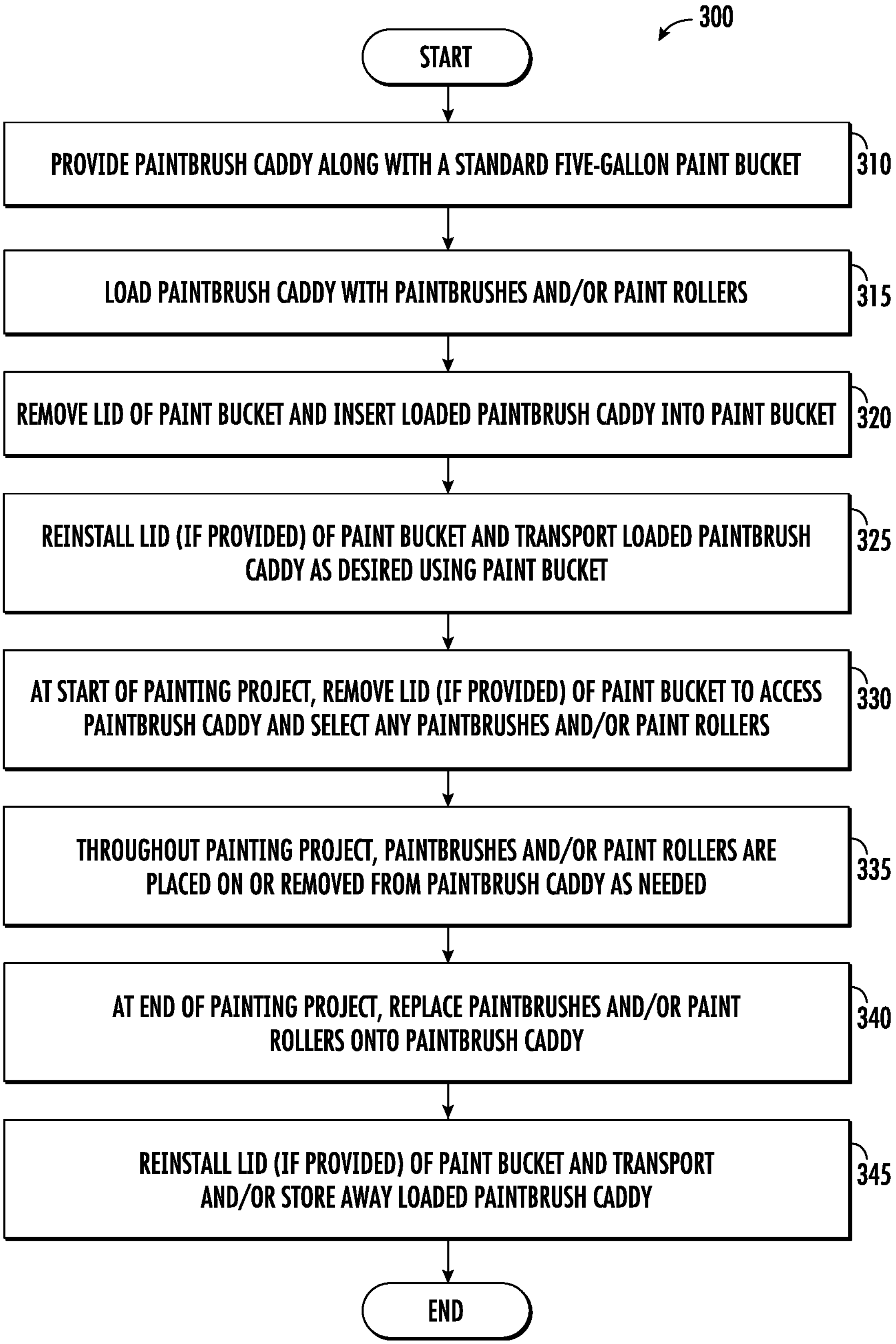

Having thus described the subject matter of the invention in general terms, reference will now be made to the accompanying drawings, which are not necessarily drawn to scale, and wherein:

FIG. 1 illustrates an example of a paintbrush and paint roller support rack, in accordance with an embodiment of the invention;

FIG. 2 illustrates an example of the paintbrush and paint roller support rack shown in FIG. 1 next to a standard five-gallon paint bucket, in accordance with an embodiment of the invention;

FIG. 3 illustrates an example of the paintbrush and paint roller support rack shown in FIG. 1 placed inside a standard five-gallon paint bucket, in accordance with an embodiment of the invention;

FIG. 4 and FIG. 5 illustrate an example of the paintbrush and paint roller support rack shown in FIG. 1 loaded with paintbrushes and/or paint rollers in relation to a standard five-gallon paint bucket, in accordance with an embodiment of the invention;

FIG. 6 and FIG. 7 illustrate schematic views of an example of the paintbrush and paint roller support rack shown in FIG. 1 through FIG. 5, in accordance with an embodiment of the invention;

FIG. 8 illustrates a schematic top-down view of an example of the frame-portion only of the paintbrush and paint roller support rack shown in FIG. 1 through FIG. 5, in accordance with an embodiment of the invention;

FIG. 9 illustrates a schematic top-down view of an example of the holding members-portion only of the paintbrush and paint roller support rack shown in FIG. 1 through FIG. 5, in accordance with an embodiment of the invention;

FIG. 10 illustrates a schematic top-down view of an example of an overlay of the frame-portion and the holding members-portion of the paintbrush and paint roller support rack shown in FIG. 1 through FIG. 5, in accordance with an embodiment of the invention;

FIG. 11 and FIG. 12 illustrate more details of an example of the arms of the paintbrush and paint roller support rack shown in FIG. 1 through FIG. 5, in accordance with an embodiment of the invention;

FIG. 13 and FIG. 14 illustrate schematic views of another example of a paintbrush and paint roller support rack, in accordance with an embodiment of the invention;

FIG. 15 illustrates a flow diagram of an example method of using the paintbrush and paint roller support rack, in accordance with an embodiment of the invention.

Figure 16:
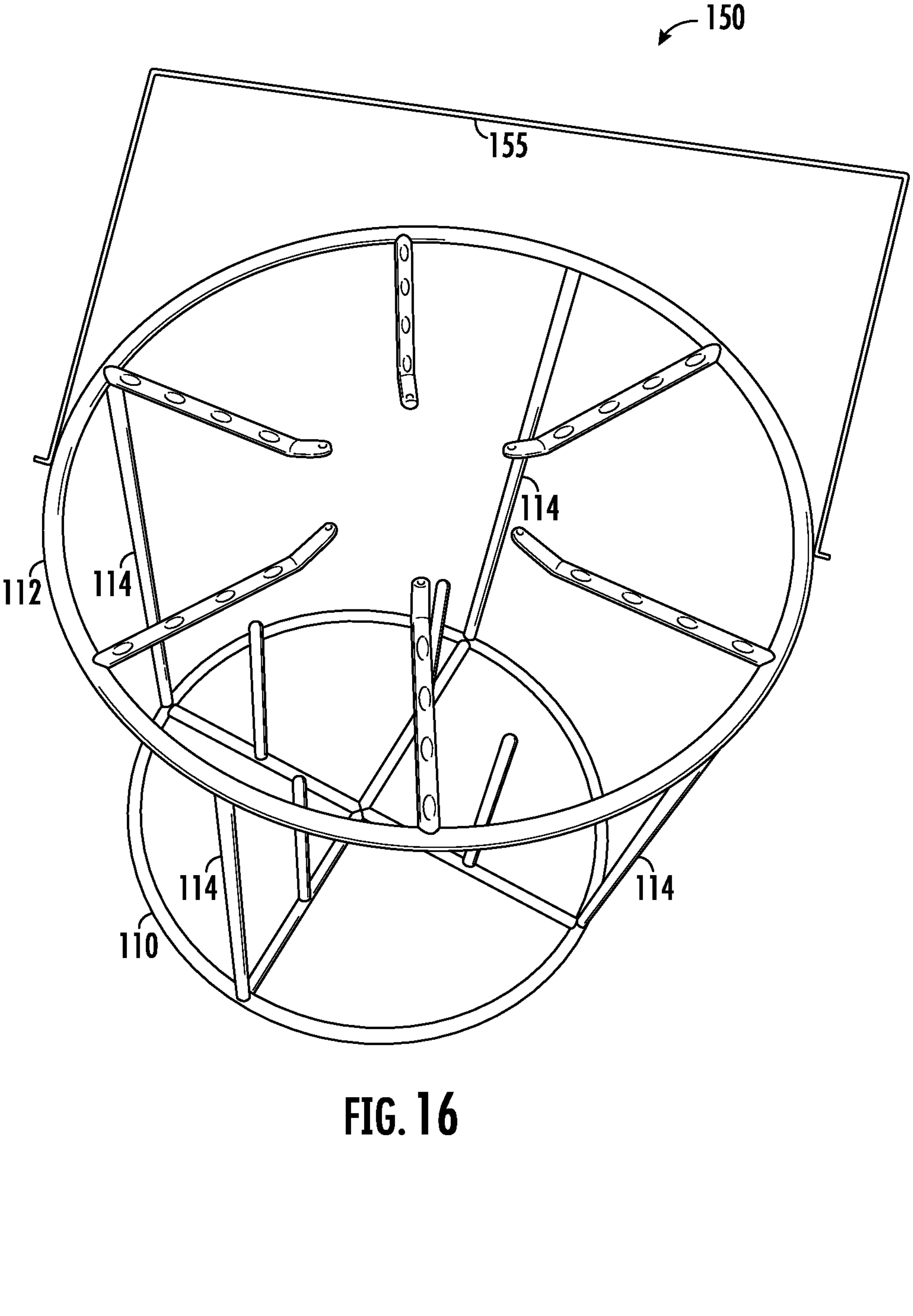
Figure 17:
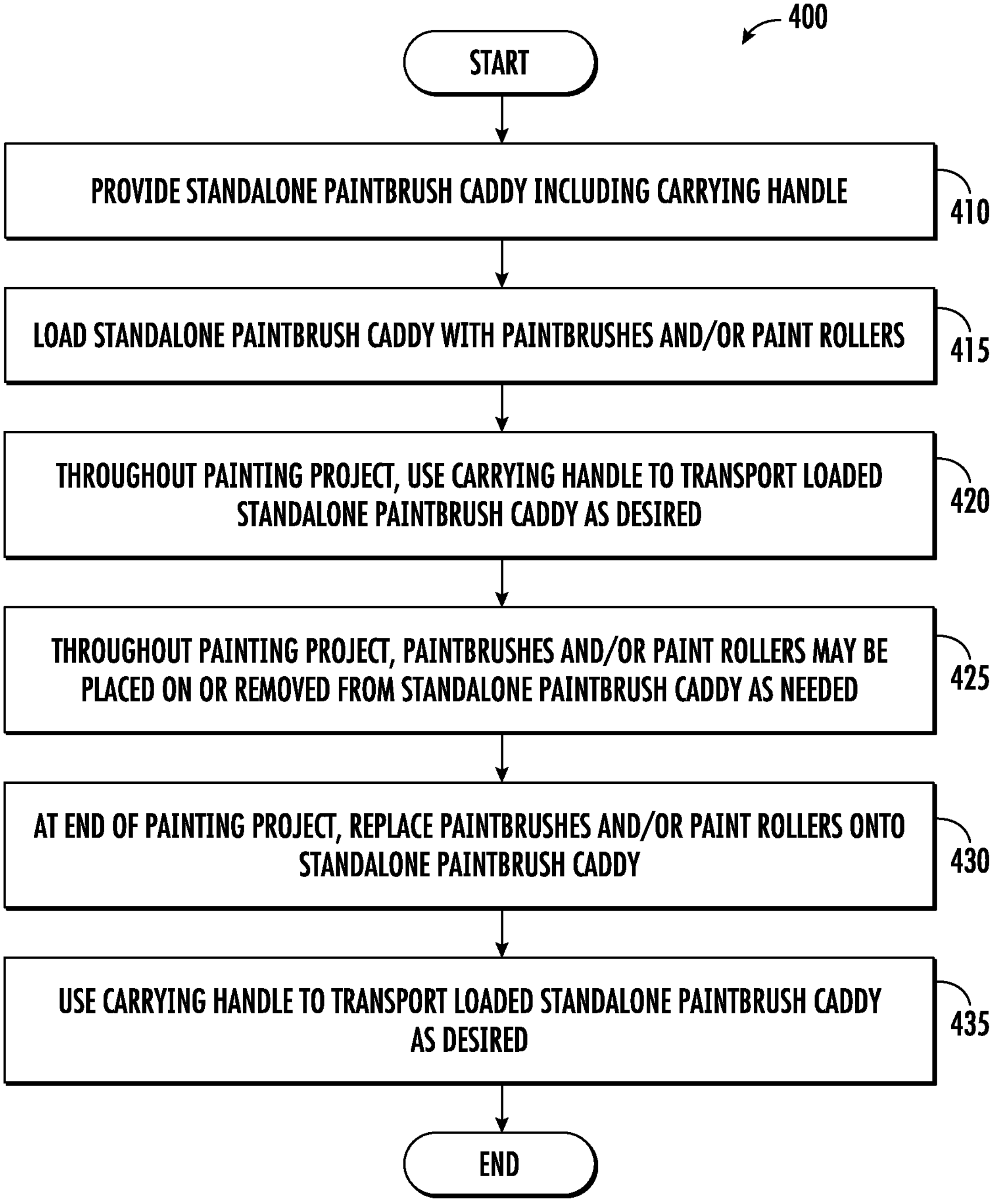

FIG. 16 shows an example of a standalone paintbrush and paint roller support rack including a carrying hand, in accordance with an embodiment of the invention; and FIG. 17 illustrates a flow diagram of an example method of using the standalone paintbrush and paint roller support rack shown in FIG. 16, in accordance with an embodiment of the invention.

DETAILED DESCRIPTION

The subject matter of the invention now will be described more fully hereinafter with reference to the accompanying drawings, in which some, but not all embodiments of the subject matter of the invention are shown. Like numbers refer to like elements throughout. The subject matter of the invention may be embodied in many different forms and should not be construed as limited to the embodiments set forth herein; rather, these embodiments are provided so that this disclosure will satisfy applicable legal requirements. Indeed, many modifications and other embodiments of the subject matter of the invention set forth herein will come to mind to one skilled in the art to which the subject matter of the invention pertains having the benefit of the teachings presented in the foregoing descriptions and the associated drawings. Therefore, it is to be understood that the subject matter of the invention is not to be limited to the specific embodiments disclosed and that modifications and other embodiments are intended to be included within the scope of the appended claims.

In some embodiments, the subject matter of the invention provides a paintbrush and paint roller support rack and methods of using same.

In some embodiments, the paintbrush and paint roller support rack and methods may provide a means for preserving, storing, protecting, and/or transporting paintbrushes and/or paint rollers and for extending the life and/or function of the bristles, shanks, and/or handles.

In some embodiments, the paintbrush and paint roller support rack and methods may include, for example, a lower ring and an upper ring connected mechanically via an arrangement of vertical members.

In some embodiments, the paintbrush and paint roller support rack and methods may include, for example, a lower ring having cross members with vertical pegs (e.g., four pegs) for holding paint rollers.

In some embodiments, the paintbrush and paint roller support rack and methods may include, for example, an upper ring having an arrangement of arms (e.g., six arms) from which paintbrushes may be hung.

In some embodiments, the paintbrush and paint roller support rack and methods may include, for example, an upper ring having an arrangement of arms and wherein each arm may have an angled tip and one or more notches for positioning the paintbrushes.

In some embodiments, the paintbrush and paint roller support rack and methods may provide a lower ring and an upper ring and wherein the diameters of the lower ring and the upper ring may be different; for example, the lower ring may have a smaller diameter than the upper ring.

In some embodiments, the paintbrush and paint roller support rack and methods may provide a lower ring and an upper ring and wherein the diameters of the lower ring and the upper ring may be substantially the same.

In some embodiments, the paintbrush and paint roller support rack and methods may be used for preserving, storing, protecting, and/or transporting up to about, for example, twenty-four (24) paintbrushes and/or up to about, for example, four (4) paint rollers.

In some embodiments, a method of using the paintbrush and paint roller support rack may include the steps of placing paint rollers on the pegs and/or hanging paintbrushes on the arms of the paintbrush and paint roller support rack, then placing the paintbrush and paint roller support rack in a standard five-gallon paint bucket, and then using the standard five-gallon paint bucket to pick up, transport, and/or store the paintbrush and paint roller support rack. Alternatively, the step of placing paint rollers on the pegs and/or hanging paintbrushes on the arms of the paintbrush and paint roller support rack may be conducted while the paintbrush and paint roller support rack is in the standard five-gallon paint bucket.

In some embodiments, the paintbrush and paint roller support rack and methods may provide a standalone paintbrush and paint roller support rack including, for example, a lower ring and an upper ring mechanically connected via an arrangement of vertical members and wherein a carrying handle is provided on the upper ring.

In some embodiments, a method of using the standalone paintbrush and paint roller support rack may include the steps of placing paint rollers on the pegs and/or hanging paintbrushes on the arms of the paintbrush and paint roller support rack and then using the carrying handle to pick up and transport the paintbrush and paint roller support rack.

Referring now to FIG. 1 through FIG. 5 show an example of a paintbrush and paint roller support rack 100, in accordance with an embodiment of the invention. For example, FIG. 1 shows paintbrush and paint roller support rack 100. FIG. 2 shows paintbrush and paint roller support rack 100 next to a bucket 200, such as standard five-gallon paint bucket. FIG. 3 shows paintbrush and paint roller support rack 100 positioned inside bucket 200. FIG. 4 and FIG. 5 show paintbrush and paint roller support rack 100 loaded with paintbrushes 210 and/or paint rollers 220 in relation to bucket 200.

In one example, paintbrush and paint roller support rack 100 may be designed to be inserted into a bucket 200, such as a standard five-gallon paint bucket. Once inside bucket 200, bucket 200 may be used to pick up and transport paintbrush and paint roller support rack 100. A main feature of paintbrush and paint roller support rack 100 is that it may be used for preserving, storing, protecting, and/or transporting several paintbrushes 210 and/or paint rollers 220. In one non-limiting example, up to about twenty-four (24) paintbrushes 210 and/or up to about four (4) paint rollers 220. However, paintbrush and paint roller support rack 100 may be designed to hold less or more than about up to twenty-four (24) paintbrushes 210 and/or up to about four (4) paint rollers 220.

In one example, paintbrush and paint roller support rack 100 may include a lower ring 110 and an upper ring 112 that are connected mechanically via an arrangement of vertical members 114. In one example, four vertical members 114 support lower ring 110 and upper ring 112. However, paintbrush and paint roller support rack 100 may include more or less than four vertical members 114. Further, lower ring 110 may have cross members 116 that support multiple pegs 118 for holding paint rollers (e.g., paint rollers 220). In one example, each peg 118 may be in the range of about 4 inches to about 8 inches long, and in one non-limiting example about 6 inches. However, each peg 118 may be of any suitable length.

Further, upper ring 112 supports an arrangement of arms 120 from which paintbrushes (e.g., paintbrushes 210) may be hung. In one example, upper ring 112 may supports six arms 120. However upper ring 112, may support more or less than six arms 120. Further, multiple notches 126 (e.g., four notches 126 or other suitable number of notches 126) may be arranged along the length of each arm 120. More details of an example of an arm 120 are shown hereinbelow with reference to FIG. 11 and FIG. 12.

Lower ring 110, upper ring 112, vertical members 114, cross members 116, pegs 118, and arms 120 of paintbrush and paint roller support rack 100 may formed of strong and rigid rod-like or tube-like members. Lower ring 110, upper ring 112, vertical members 114, cross members 116, pegs 118, and arms 120 of paintbrush and paint roller support rack 100 may formed of, for example, plastic or metal (e.g., aluminum or other suitable material). Further, the cross-sectional diameter (not shown) of all members forming paintbrush and paint roller support rack 100 may be, for example, in the range of about 0.25 inches, or other suitable diameter. More details of an example of paintbrush and paint roller support rack 100 are shown hereinbelow with reference to FIG. 6 through FIG. 10.

Referring now to FIG. 6 and FIG. 7 is schematic views of paintbrush and paint roller support rack 100 shown in FIG. 1 through FIG. 5. In this example, lower ring 110 and upper ring 112 may have different diameters. For example, the diameter of lower ring 110 may be smaller than the diameter of upper ring 112. Further to the example, lower ring 110 may have a diameter d1 and upper ring 112 may have a diameter d2. Further, paintbrush and paint roller support rack 100 may have an overall height h. Further, FIG. 7 shows that lower ring 110 and upper ring 112 may be substantially centered along a vertical axis a.

In one example, paintbrush and paint roller support rack 100 may be sized to be inserted into a standard five-gallon paint bucket (e.g., bucket 200). In this example, diameter d1 of lower ring 110 may be in the range of about 10 inches to about 12 inches, and in one non-limiting example about 10¼ inches, diameter d2 of upper ring 112 may be in the range of about 11 inches to about 12 inches, and in one non-limiting example about 11¼ inches, and height h of paintbrush and paint roller support rack 100 may be in the range of about 11 inches to about 13 inches, and in one non-limiting example about 12 inches. However, diameter d1 of lower ring 110, diameter d2 of upper ring 112, and height h of paintbrush and paint roller support rack 100 may be of any suitable dimension more or less than the dimensions referenced above.

Referring now to FIG. 8 is a schematic top-down view of the frame-portion only of paintbrush and paint roller support rack 100 shown in FIG. 1 through FIG. 5. That is, this view shows lower ring 110, upper ring 112, vertical members 114, and cross members 116 of paintbrush and paint roller support rack 100, while pegs 118 and arms 120 are not shown.

Referring now to FIG. 9 is a schematic top-down view of an example of the holding members-portion only of paintbrush and paint roller support rack 100 shown in FIG. 1 through FIG. 5. That is, this view shows pegs 118 and arms 120 of paintbrush and paint roller support rack 100, while lower ring 110, upper ring 112, vertical members 114, and cross members 116 are not shown. The arrangement of pegs 118 in relation to arms 120 is not limited to that as shown in FIG. 9, and pegs 118 and arms 120 may be positioned in any relation relative to one another, e.g., aligned, staggered, some aligned and some staggered, or any other configuration.

Referring now to FIG. 10 is a schematic top-down view of an example overlay of the frame-portion and the holding members-portion of paintbrush and paint roller support rack 100 shown in FIG. 1 through FIG. 5. That is, this view shows the arrangement of pegs 118 and arms 120 of paintbrush and paint roller support rack 100 overlaid atop the arrangement of lower ring 110, upper ring 112, vertical members 114, and cross members 116.

Referring now to FIG. 11 and FIG. 12 shows more details of arms 120 of paintbrush and paint roller support rack 100 shown in FIG. 1 through FIG. 5. In this example, arm 120 may include a straight portion 122 and an angled tip 124. Further, multiple notches 126 (e.g., four) may be arranged along straight portion 122 of arm 120. The straight portion 122 may include more or less than four notches 126.

In this example, straight portion 122 has a length L1, angled tip 124 has a length L2, and arm 120 has an overall length L3. Further, angled tip 124 may be set at an angle $\alpha$ with respect to the plane of straight portion 122. Further, each of the notches 126 may have a span S. Further, the line of notches 126 may have an on-center spacing s.

In one example, length L1 of straight portion 122 may be, for example, in the range of about 3.25 inches, length L2 of angled tip 124 may be, for example, in the range of about 0.75 inches, and overall length L3 of arm 120 may be in the range of about 3 inches to about 5 inches, and in one non-limiting example about 4 inches, or other suitable length. Further, angle $\alpha$ of angled tip 124 may be set at, for example, in the range of about 0-90 degrees. In one example, the span S of each of the notches 126 may be, for example, in the range of about 0.25 inches. Further, the on-center spacing s of notches 126 may be, for example, in the range of about 1 inch. Additionally, the cross-sectional diameter (not shown) of arm 120 may be sized to fit through the hole in the handle of any standard paintbrush. In one example, the cross-sectional diameter of arm 120 may be, for example, in the range of about 0.25 inches. However, the length L1 of straight portion 122, length L2 of angled tip 124, overall length L3 of arm 120, angle $\alpha$ of angled tip 124, span S of each of the notches 126, on-center spacing s of notches 126, and cross-sectional diameter of arm 120 may be of any suitable dimension more or less than the dimensions referenced above.

Referring now to FIG. 13 and FIG. 14 is schematic views of another example of paintbrush and paint roller support rack 100, in accordance with an embodiment of the invention. In this example, lower ring 110 and upper ring 112 may have substantially the same diameters. Again, lower ring 110 and upper ring 112 may be substantially centered along a vertical axis a, as shown in FIG. 15. Again, paintbrush and paint roller support rack 100 may be sized to be inserted into a standard five-gallon paint bucket (e.g., bucket 200). In this example, both diameter d1 of lower ring 110 and diameter d2 of upper ring 112 may be in the range of about 10 inches to about 12 inches, and in one non-limiting example about 11¼ inches. Height h of paintbrush and paint roller support rack 100 may be in the range of about 11 inches to about 13 inches, and in one non-limiting example about 12 inches. However, diameter d1 of lower ring 110, diameter d2 of upper ring 112, and height h of paintbrush and paint roller support rack 100 may be of any suitable dimension more or less than the dimensions referenced above.

Referring now to FIG. 15 is a flow diagram of an example of a method 300 of using paintbrush and paint roller support rack 100, in accordance with an embodiment of the invention. Method 300 may include, but is not limited to, the following steps, and may not include all of the steps.

At a step 310, the paintbrush and paint roller support rack is provided. Additionally, a standard five-gallon paint bucket may be provided, which may include a lid. For example, paintbrush and paint roller support rack 100 as shown hereinabove with reference to FIG. 1 through FIG. 14 may be provided. Additionally, bucket 200, which may include a lid (not shown) may be provided.

At a step 315, the paintbrush and paint roller support rack may be loaded with paintbrushes and/or paint rollers. For example, arms 120 of paintbrush and paint roller support rack 100 may be loaded with one or more paintbrushes 210 (see FIG. 4 and FIG. Further, one or more paint rollers 220 may be loaded onto respective pegs 118 of paintbrush and paint roller support rack 100 (see FIG. 4).

At a step 320, the lid (if provided) of the paint bucket may be removed and the loaded paintbrush and paint roller support rack may be inserted into the paint bucket. For example, the lid (if provided) may be removed from atop bucket 200. Then, the loaded paintbrush and paint roller support rack 100 may be inserted into bucket 200 (see FIG. 4 and FIG. 5).

At a step 325, the lid (if provided) of the paint bucket may be reinstalled and the loaded paintbrush and paint roller support rack may be transported about as desired using the paint bucket. For example, the lid (if provided) may be reinstalled atop bucket 200. Then, the loaded paintbrush and paint roller support rack 100 may be transported about as desired using bucket 200.

At a step 330, at the start of a painting project, the lid (if provided) of paint bucket may be removed to access the paintbrush and paint roller support rack and to select any paintbrushes and/or paint rollers. For example, at the start of a painting project, the lid (if provided) may be removed from atop bucket 200 to access paintbrush and paint roller support rack 100. Then, the user may select any paintbrushes 210 and/or paint rollers 220.

At a step 335, throughout the painting project, paintbrushes and/or paint rollers may be placed on or removed from the paintbrush and paint roller support rack as needed. For example, throughout the painting project, paintbrushes 210 and/or paint rollers 220 may be placed on or removed from paintbrush and paint roller support rack 100 as needed.

At a step 340, at the end of the painting project, paintbrushes and/or paint rollers may be replaced onto the paintbrush and paint roller support rack. For example, at the end of the painting project, paintbrushes 210 and/or paint rollers 220 may be replaced onto paintbrush and paint roller support rack 100.

At a step 345, the lid (if provided) of the paint bucket may be reinstalled and the loaded paintbrush and paint roller support rack may be transported and/or stored away. For example, the lid (if provided) may be reinstalled atop bucket 200. Then, using the closed bucket 200, the loaded paintbrush and paint roller support rack 100 may be transported and/or stored away.

In method 300, the steps are not limited to the order as shown above. For example, steps 320 and 315 may be reversed. That is, the paintbrush and paint roller support rack 100 may be inserted in to the bucket 200 and then loaded with one or more paintbrushes 210 and/or one or more paint rollers 220.

Referring now to FIG. 16 is an example of a standalone paintbrush and paint roller support rack 150 including a carrying hand 155, in accordance with an embodiment of the invention. standalone paintbrush and paint roller support rack 150 may be substantially the same as the paintbrush and paint roller support rack 100 shown and described hereinabove with reference to FIG. 1 through FIG. 14 except for the inclusion of carrying hand 155.

In standalone paintbrush and paint roller support rack 150, carrying hand 155 may be provided at upper ring 112. In this example, a bucket, such as bucket 200, is not required to transport standalone paintbrush and paint roller support rack 150. Rather, standalone paintbrush and paint roller support rack 150 may stand in and be used in free space. Then, using carrying hand 155, standalone paintbrush and paint roller support rack 150 may be picked up and transported away.

Referring now to FIG. 17 is a flow diagram of an example of a method 400 of using standalone paintbrush and paint roller support rack 150 shown in FIG. 16, in accordance with an embodiment of the invention. Method 400 may include, but is not limited to, the following steps.

At a step 410, the standalone paintbrush and paint roller support rack including the carrying handle may be provided. For example, standalone paintbrush and paint roller support rack 150 shown in FIG. 16 that includes carrying hand 155 may be provided.

At a step 415, the standalone paintbrush and paint roller support rack may be loaded with paintbrushes and/or paint rollers. For example, arms 120 of standalone paintbrush and paint roller support rack 150 may be loaded with one or more paintbrushes 210. Further, one or more paint rollers 220 may be loaded onto respective pegs 118 of standalone paintbrush and paint roller support rack 150.

At a step 420, throughout painting project, the carrying handle may be used to transport the loaded standalone paintbrush and paint roller support rack as desired. For example, throughout painting project, carrying hand 155 may be used to pick up and transport the loaded standalone paintbrush and paint roller support rack 150 as desired.

At a step 425, throughout the painting project, paintbrushes and/or paint rollers may be placed on or removed from the standalone paintbrush and paint roller support rack as needed. For example, throughout the painting project, paintbrushes 210 and/or paint rollers 220 may be placed on or removed from standalone paintbrush and paint roller support rack 150 as needed.

At a step 430, at the end of the painting project, paintbrushes and/or paint rollers may be replaced onto the standalone paintbrush and paint roller support rack. For example, at the end of the painting project, paintbrushes 210 and/or paint rollers 220 may be replaced onto standalone paintbrush and paint roller support rack 150.

At a step 435, the carrying handle may be used to transport away the loaded standalone paintbrush and paint roller support rack as desired. For example, carrying hand 155 may be used to transport away the loaded standalone paintbrush and paint roller support rack 150 as desired.

In method 400, the steps are not limited to the order as shown above, and may include fewer or more steps.

In summary and referring now again to FIG. 1 through FIG. 17, paintbrush and paint roller support rack 100 and method 300, and standalone paintbrush and paint roller support rack 150 and method 400 may provide a means for preserving, storing, protecting, and/or transporting paintbrushes and/or paint rollers and for extending the life and/or function of the bristles, shanks, and/or handles.

Further, the use of paintbrush and paint roller support rack 100 and method 300 and standalone paintbrush and paint roller support rack 150 and method 400 is not limited to residential and/or commercial painting. Other uses are possible. For example, the use of paintbrush and paint roller support rack 100 and method 300 and standalone paintbrush and paint roller support rack 150 and method 400 may be expanded into the arts, beauty, and other industries that use brushes for any purpose.

Further, the dimensions of paintbrush and paint roller support rack 100 and/or standalone paintbrush and paint roller support rack 150 is not limited to those described hereinabove. The dimensions of paintbrush and paint roller support rack 100 and/or standalone paintbrush and paint roller support rack 150 described hereinabove are exemplary only. Paintbrush and paint roller support rack 100 and/or standalone paintbrush and paint roller support rack 150 may be scaled to any other sizes and/or other dimensions and also scaled to hold any number of paintbrushes and/or paint rollers.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the subject matter of the present invention. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A paintbrush and paint roller support rack, comprising:

a. an upper support rack having a generally ring shape, the upper support rack including a plurality of upper horizontal support members spaced thereabout, wherein each of the plurality of upper horizontal support members have a first end attached to the upper support rack and a second end extending inward toward a center point of the upper support rack, and wherein each of the plurality of upper horizontal support members include an angled tip portion, and further wherein each of the plurality of upper horizontal support members include a plurality of generally ovular shaped notches formed along a top surface thereof;

b. a lower support rack having a generally ring shape, comprising:

i. inward extending lower horizontal members spaced thereabout; and ii. one or more support pegs extending vertically upwards from one or more of the lower horizontal members; and c. vertical members extending between the lower support rack and the upper support rack, the vertical members supporting the upper support rack a distance above the lower support rack.

2. The paintbrush and paint roller support rack of claim 1, wherein the lower horizontal members are configured as one or more cross members.

3. The paintbrush and paint roller support rack of claim 1, wherein the distance between the upper support rack and the lower support rack is substantially equal to or less than a height of a 5-gallon paint style bucket.

4. The paintbrush and paint roller support rack of claim 1, wherein the upper support rack has a diameter larger than that of the lower support rack.

5. The paintbrush and paint roller support rack of claim 1, wherein both the upper support rack and the lower support rack have a diameter smaller than that of a 5-gallon paint style bucket.

6. The paintbrush and paint roller support rack of claim 1, wherein the upper support rack and the lower support rack are substantially centered along a common vertical axis.

7. The paintbrush and paint roller support rack of claim 1, wherein the upper horizontal support members have a cross-sectional diameter such that they fit through a hole in a handle of a paintbrush.

8. The paintbrush and paint roller support rack of claim 1, wherein the upper horizontal support members have a cross-sectional diameter of about 0.25 inches.

9. The paintbrush and paint roller support rack of claim 1, wherein each of the upper horizontal support members have a length equal to or less than the radius of the upper support rack.

10. The paintbrush and paint roller support rack of claim 1, wherein the one or more support pegs have a cross-sectional diameter such that they fit within a hollow center portion of a paint roller.

11. The paintbrush and paint roller support rack of claim 1, further comprising a carrying handle attached to the upper support rack.

12. A method of using a paintbrush and paint roller support rack, the method comprising:

a. providing a paintbrush and paint roller support rack, comprising:

i. an upper support rack having a generally ring shape, the upper support rack including a plurality upper horizontal support members spaced thereabout wherein each of the plurality of upper horizontal support members have a first end attached to the upper support rack and a second end extending inward toward a center point of the upper support rack, and wherein each of the plurality of upper horizontal support members include an angled tip portion, and further wherein each of the plurality of upper horizontal support members include a plurality of generally ovular shaped notches formed along a top surface thereof;

ii. a lower support rack having a generally ring shape, comprising: inward extending lower horizontal members spaced thereabout; and one or more support pegs extending vertically upwards from one or more of the lower horizontal members; and iii. vertical members extending between the lower support rack and the upper support rack, the vertical members supporting the upper support rack a distance above the lower support rack; and b. loading one or more paintbrushes and/or paint rollers onto one or more of the upper horizontal support members and/or one or more of the support pegs respectively.

13. The method of claim 12, further comprising providing a 5-gallon paint style bucket and inserting the paintbrush and paint roller support rack into the 5-gallon paint style bucket either prior to or after loading the paintbrush and paint roller support rack with one or more of paintbrushes and/or paint rollers.

14. The method of claim 12, further comprising installing a lid on the 5-gallon paint style bucket with the paintbrush and paint roller support rack installed therein.

* * * * *